(12) United States Patent
Felisari et al.

(10) Patent No.: US 9,403,105 B2
(45) Date of Patent: Aug. 2, 2016

(54) PROCESS FOR THE DEPRESSURIZATION OF FLUIDS AND DEVICE SUITABLE FOR THE PURPOSE

(75) Inventors: Riccardo Felisari, S. Giorgio di Mantova (IT); Alessandro Casalini, Mantova (IT)

(73) Assignee: Versalis S.P.A. (IT)

( * ) Notice: Subject to any disclaimer, the term of this patent is extended or adjusted under 35 U.S.C. 154(b) by 204 days.

(21) Appl. No.: 13/976,345

(22) PCT Filed: Dec. 28, 2011

(86) PCT No.: PCT/IB2011/055987
§ 371 (c)(1),
(2), (4) Date: Sep. 3, 2013

(87) PCT Pub. No.: WO2012/090166
PCT Pub. Date: Jul. 5, 2012

(65) Prior Publication Data
US 2013/0333558 A1    Dec. 19, 2013

(30) Foreign Application Priority Data
Dec. 28, 2010   (IT) .............................. MI2010A2429

(51) Int. Cl.
*B01D 19/00* (2006.01)

(52) U.S. Cl.
CPC ........ *B01D 19/0042* (2013.01); *B01D 19/0057* (2013.01)

(58) Field of Classification Search
CPC .... B01D 19/00; B01D 19/0042; B01D 46/04; B01D 46/46; B01D 53/02; B01D 53/047
USPC ............ 95/19, 260, 97, 96; 96/194, 131, 108, 96/121
See application file for complete search history.

(56) References Cited

U.S. PATENT DOCUMENTS

| | | | | |
|---|---|---|---|---|
| 3,792,067 A | * | 2/1974 | Coombes et al. ............. | 554/144 |
| 4,515,629 A | * | 5/1985 | Dizek et al. ..................... | 75/343 |
| 5,036,909 A | * | 8/1991 | Whitehead ............ | F28D 1/0391 165/133 |
| 6,036,751 A | * | 3/2000 | Ribardi et al. .................. | 95/273 |
| 6,506,281 B1 | | 1/2003 | Casper et al. | |
| 2004/0231510 A1 | * | 11/2004 | Nakamura et al. ................ | 95/96 |
| 2005/0066815 A1 | * | 3/2005 | Krushnevych et al. ......... | 96/108 |
| 2006/0288869 A1 | * | 12/2006 | Warren et al. ................... | 95/130 |
| 2011/0005391 A1 | * | 1/2011 | Cho et al. .......................... | 95/97 |
| 2014/0326139 A1 | * | 11/2014 | Kokubu et al. .................... | 95/96 |
| 2015/0010445 A1 | * | 1/2015 | Makatsoris .......... | B01J 19/0093 422/631 |

FOREIGN PATENT DOCUMENTS

| WO | 9955457 A1 | 11/1999 |
|---|---|---|
| WO | 2008122812 A2 | 10/2008 |

* cited by examiner

*Primary Examiner* — Duane Smith
*Assistant Examiner* — Minh-Chau Pham
(74) *Attorney, Agent, or Firm* — Tarolli, Sundheim, Covell & Tummino LLP (57) ABSTRACT

A process and device to reduce the pressure of fluid containing liquid and possibly a gaseous phase or solid particles without reducing the cross sectional area or using moving parts. The pressure reduction is obtained by passing the fluid to be depressurized, in sequence, through a plurality of pairs of steps. In the first step of each pair, part of the pressure energy of the fluid is converted to gravitational potential; in the second step the gravitational potential is converted into thermal energy, so as to prevent the reconversion of the same into pressure energy.

13 Claims, 5 Drawing Sheets

PROCESS FOR THE DEPRESSURIZATION OF FLUIDS AND DEVICE SUITABLE FOR THE PURPOSE

RELATED APPLICATION

This application is a National Phase filing of PCT/IB2011/055987, filed Dec. 28, 2011, and claims priority to Italian Application No. MI2010A002429, filed Dec. 28, 2010, the subject matter of which are incorporated herein by reference in their entirety.

FIELD OF THE INVENTION

The present invention relates to a process for the depressurization of fluids and the device suitable for the purpose.

More specifically, the present invention relates to a process for the depressurization of fluids (liquids, or liquid mixtures containing a gaseous phase) which can carry solid particles or agglomerates. The present invention also relates to the device and relative uses.

The device of the process, object of the present invention, can be advantageously used for reducing the pressure of fluids which contain solid parts or which contain material which could be modified if subjected to friction or excessive shear stress; or for reducing the pressure of dangerous fluids or fluids which operate in high-reliability processes, where maintenance interventions and the probability of breakdowns must be reduced to the minimum; or again for reducing the pressure of fluids which, for process or product reasons, advance at a low rate.

In particular, the device, object of the present invention, is effective when the fluid transported contains solids which can occasionally have extremely large dimensions, for example aggregates with a dimension comparable to the diameter of the transporting pipeline.

These aggregates can be formed, for example, in the cutting of thermoplastic polymers. The polymer in the molten state is typically passed through a plurality of holes situated in a die. A series of knives, in continuous rotation and with the cutting blade in correspondence with the surface of the die, ensures its granulation.

The granules thus obtained are cooled and removed by means of a thermoregulating fluid. Various granulation procedures are known, as described, for example, in the following patents and patent applications: WO 03/106544; WO 03/053650; WO 2007/087001; WO 2007/089497. More specifically, the device of the present invention can be applied to underwater water-ring or -water spray cutting equipment, as described in patent WO 03/053650.

In these applications, the fluid transported consists of the thermovector fluid, generally water, and the granulated thermoplastic polymer.

Among thermoplastic polymers to which the present invention can be applied, there are vinyl and vinyl aromatic polymers, optionally expandable. More specifically, the present invention can be applied to the depressurization of the fluid resulting from the granulation of polystyrene, expandable polystyrene, and its alloys.

The device of the present invention is not limited to particular pressure ranges. The pressure at the inlet of the device is generally that of the fluid leaving the granulator, whereas the pressure at the outlet is atmospheric pressure. At the outlet, there is typically, in fact, a device for the separation of the thermovector fluid, possibly a device for the sieving and dimensional classification of the product, or a drier. All of these devices generally operate at atmospheric pressure.

Even more specifically, the pressure at the inlet generally ranges from 100 relative kPa to 2 relative MPa (1 and 20 relative bar) whereas the pressure at the outlet is atmospheric pressure or slightly higher. In the present description and claims hereunder, the reference to the pressure is relative pressure (gauge).

Although the operating temperature is not limited to particular values, it is generally the temperature of the fluid transported. For the applications described above, the temperature generally ranges from 0 to 100° C.

DESCRIPTION OF THE KNOWN ART

Depressurization devices typically effect the pressure reduction by friction, i.e. by converting the mechanical energy of the fluid into thermal energy. Lamination and control valves, for example those described in EP 410.081, form part of this category. More generally, devices which, by reducing the cross sectional area of the fluid, increase its rate and therefore the friction, belong to this category (for example, WO 2010/080037); or again devices which, by increasing the surface wet by the fluid to be depressurized (for example by interpositioning a grid) cause an increase in the pressure drops due to friction (see e.g. WO 2007/126863).

These devices are not suitable when there can be the presence in the fluid, of solid agglomerates or other rubbery or even sticky materials, which can in some way obstruct the cross sectional area of the fluid close to the neck.

A second category of pressure-reducing devices envisages the use of units in movement, which transform the pressure energy into a mechanical movement of the unit itself. Turbines or inverse pumps form part of this category, wherein the fluid acts as driving fluid and the mechanical work thus obtained is transformed into electric energy or re-used for compressing or pumping another fluid, or simply dissipated into thermal energy (see, for example, patent application USA 2009/108480). Devices which use energy for depressurizing the fluid belong to this category, for example centrifugal pumps inverted, i.e. with the suction on the depressurized side and the discharge on the side to be depressurized (see, for example, WO 2007/131613).

Other devices use parts in movement for mechanically separating the high-pressure zone from the low-pressure zone, contemporaneously transporting the fluid, which can contain solid parts, from one zone to the other. An example of this category is represented by stellar valves and more generally devices which drive the bodies in rotation through which spaces or channels are created which are cyclically in communication with the low- and high-pressure zones (see, for example, JP 2007/268406).

As these devices have parts in movement, they are subject to wear and have a poor reliability. Furthermore, the maximum dimension of the solid transported is generally lower than the dimension of the pipeline and the shear rate, which is generally high, prevents its use in the presence of delicate fluids.

In the devices described above, and especially in devices based on friction of the fluid such as regulation valves, the pressure drops obtained greatly depend on the flow-rate of the fluid to be depressurized. This limits the application range and can cause instability following significant fluctuations of the flow-rate at the inlet.

A third category comprises single barometric column devices which use a vertical pipe in which the fluid to be depressurized, also possibly containing a gaseous phase, is passed upwards so as to transform the pressure energy into gravitational potential, and means for the subsequent dissipation of this potential, for example using a descending channel in which a channel movement is established. In order to obtain this latter result, it is generally sufficient to use a pipe with a sufficiently wide section and operate a siphon connected at atmospheric pressure to the start of the descending channel, so that the gaseous phase in the descending duct, which is substantially at atmospheric pressure, forms the continuous phase.

Even if these devices can also be applied for the use of fluids containing solid particulate, they are generally not particularly effective when a significant pressure reduction is required. The Earth's gravity is in fact limited to 9.8 m/s² and the process fluid is generally water. Therefore, the height of the pipe necessary for guaranteeing 10 bar (1 MPa) of relative pressure is equal to over 100 meters. The supporting structure necessary would be extremely important and could prove to be infeasible due to the existence of other restrictions, for example landscape and environmental impact.

Furthermore, the use of these devices for the depressurization of fluids containing both a liquid phase and a gaseous phase is generally limited by problems of instability, caused by temporary fluctuations of the pressure drops obtained through the device itself. This instability can be detrimental for the running of the equipment situated upstream of the device itself, such as for example, the granulators for the thermoplastic polymers described above.

Finally, the use of these devices does not allow the regulation of the pressure drop, as the value of the same is substantially only linked to the hydrostatic height. It is therefore not possible to dynamically vary the value of the pressure drop to adjust it to the desired values.

DESCRIPTION OF THE INVENTION

The device, object of the present invention, better described in the enclosed claims, which are an integrant part of the present description, allows the pressure of a certain fluid to be reduced (for example water), possibly also containing a gaseous phase and solid particles, without reducing the cross sectional areas and without requiring organs in movement, and without the limitations of the devices previously described.

The pressure reduction is obtained by passing the fluid to be depressurized, in sequence, through a plurality of steps arranged in series with respect to each other, and connected by means of first connectors or lower joints, for example U-shaped, each step consisting of a pair of vertical ducts, connected to each other by means of second connecters or upper joints, for example U-shaped, the first duct is ascending and the second duct descending. The lower connector of the steps is situated between the descending duct of a pair and the ascending duct of the adjacent subsequent pair according to the movement of the fluid.

Part of the pressure energy of the fluid is converted into gravitational potential in the first duct of each step; the gravitational potential is converted into thermal energy in the second duct, so as to prevent the reconversion of the same into pressure energy.

Unlike many devices in the known art, in the present device, the pressure reduction due to the friction of the fluid on the device itself is generally negligible.

In the present device, the energy conversions indicated above are typically obtained using a first duct positioned vertically, where the fluid is passed from below upwards, and a second duct, preferably having a greater diameter with respect to the first duct, where the fluid is passed from above downwards. The steps can be repeated until the desired pressure is reached. The introduction or subtraction of a gas (for example, air or nitrogen) can be regulated between the first and the second duct of each step, so as to stably obtain the desired pressure.

In particular, if the fluid to be depressurized does not contain gas, this must be introduced. The introduction can be effected in any point before the second duct of the first step. The introduction is advantageously effected between the first and the second duct of the first step. The introduction is generally regulated so that the ratio between the volumetric flow-rate of the gas, measured at the inlet pressure, with respect to the liquid, is less than 2.

For volume ratios between gas and liquid higher than 0.01, it can be useful to extract a quantity of gas from the main flow, or in any case a phase rich in gas with respect to the quantity of gas present in the main flow. The flow rate of said flow extracted can be advantageously controlled with the help of regulation valves.

In particular, when a quantity of gaseous phase is present in the main flow, with a volume ratio with respect to the liquid phase higher than 0.01, strong temporal fluctuations can be observed in the pressure drops generated by the device.

Under these conditions, the use of said extraction of a flow rich in gas from the main stream surprisingly eliminates these fluctuations, thus stabilizing the pressure drops generated by the device.

The area ratio between the section of descending duct with respect to the ascending duct is generally lower than 30, more preferably lower than 10, even more preferably lower than 5.

The section of each duct can have any form, for example the duct can have a circular, elliptical or polygonal section, for example square or rectangular.

The number of pairs of ducts generally ranges from 2 to 500; preferably from 2 to 50; even more preferably from 2 to 10.

The depressurization device thus obtained can be advantageously used for the pressure reduction of liquid or mixed liquid-gaseous fluids, containing solid parts. These solid parts can occasionally reach considerable dimensions (for example, agglomerates and aggregates), i.e. which are such as to block the cross sectional area of the devices commonly used for the depressurization of fluids (such as valves or, more generally, ducts with a reduced cross sectional area). Alternatively, the device of the present invention can be used for fluids which contain material which could be modified if subjected to excessive friction or shear stress, typical in lamination devices; or again for dangerous fluids or high-reliability processes, where maintenance interventions and the probability of breakdowns must be reduced to the minimum.

More specifically, the device of the present invention can be applied downstream of granulators for thermoplastic polymers, where the pressure of the granulation chamber must be maintained at a pressure higher than atmospheric pressure. The fluid leaving these granulators normally consists of the process fluid, generally consisting of a liquid phase (water), plus a solid phase consisting of polymer granulate, and optionally a gaseous phase. The fluid may occasionally also contain, especially at the start-up, solid agglomerates of polymer.

Among granulators for thermoplastic polymers, immersed cutting granulators (such as underwater granulators) are particularly important, in which the cutting of the polymer is effected in an environment filled with a process liquid, typically water. Another type of granulators which are particularly suitable for the present application are water spray granulators, such as for example, the device described in the U.S. Pat. No. 7,320,585.

Among thermoplastic polymers, aromatic alkenyl polymers, such as polystyrene and its alloys such as styrene-acrylonitrile (SAN), acrylonitrile-butadiene-styrene (ABS), polystyrene-polyethylene alloys, are particularly important. These polymers can optionally contain expanding agents, such as for example, mixtures of iso- and normal pentane, so as to be expandable in the presence of a suitable heat source. Expandable polystyrene (EPS) is particularly important among expandable polymers.

If compared with analogous devices previously described, such as single barometric column devices, with the device of the present invention, it is surprisingly substantially possible to maintain the pressure loss without temporary fluctuations.

Furthermore, again when compared with the single barometric column devices described above, the device, object of the present invention, can allow the pressure reduction to be dynamically varied. It is therefore possible to set up the pressure reduction at a desired value, possibly variable with time, without modifications of the device itself or interruptions.

The control is obtained by regulating the opening of the extraction valves of the phase rich in gas in feedback with respect to the pressure of the fluid itself, or, preferably, with respect to the pressure difference between the upper and lower end of the descending pipe.

In this way, it is generally possible to set up a pressure loss value for the steps subsequent to the first step, ranging from 20% to 80% of the hydrostatic height available in each step.

Furthermore, the device of the present invention is surprisingly substantially insensitive to variations in the flow-rate of the fluid at the inlet. This, together with the possibility of dynamically varying the pressure loss value, makes the device of the present invention particularly flexible and therefore suitable for the above-mentioned applications.

DETAILED DESCRIPTION OF THE INVENTION

The device of the process, object of the present invention, allows the pressure of a certain fluid to be reduced, maintaining the difference in pressure substantially stable and substantially independent of the flow-rate of the fluid.

The pressure reduction is obtained by passing the fluid to be depressurized, in sequence, through a plurality of pairs of steps. In the first step of each pair, part of the pressure energy of the fluid is converted to gravitational potential; in the second step the gravitational potential is converted into thermal energy, so as to prevent the reconversion of the same into pressure energy.

With reference to the enclosed figures, some embodiments of the present invention are now described, which should not be considered as limiting the scope of the present process/device and should not be considered as being limited to the technical solution of the reference figure, as they can be applied in any general situation.

Figure 1:
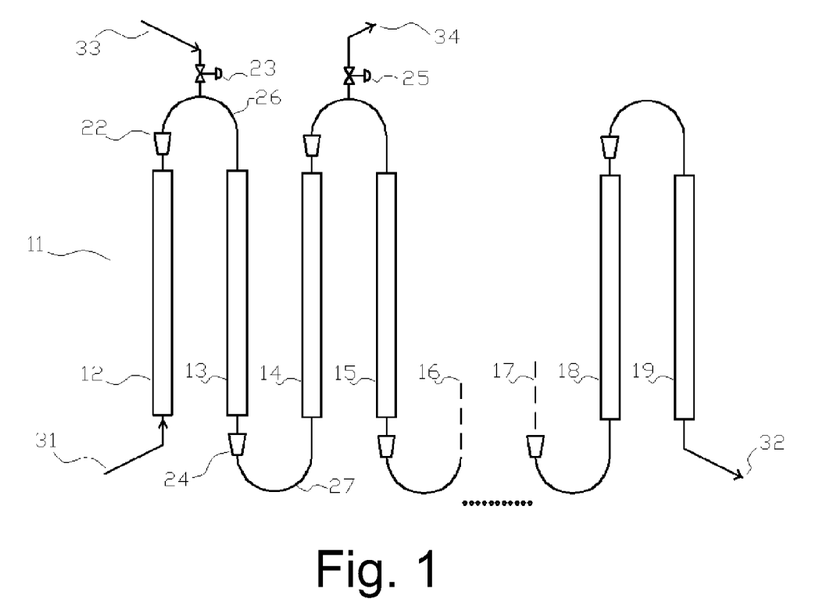

FIG. 1 illustrates a first embodiment (hereafter called "M1") of the device of the present invention. This first embodiment can be applied when the fluid to be depressurized does not contain a gaseous phase, or the volume ratio between the gaseous phase and the liquid flow-rate, evaluated at the inlet pressure, is lower than 2, preferably lower than 0.5, even more preferably lower than 0.2. With reference to FIG. 1, the device of the present invention comprises a high-pressure fluid inlet (31) which is connected to a plurality of pairs of ducts positioned vertically and connected in sequence (12, 13, 14, 15, 16, . . . 17, 18, 19). In the first duct of each pair (12, 14, 16, . . . 18), the fluid is passed from below upwards, whereas in the second duct (13, 15, 17, . . . 19), the fluid is passed from above downwards. The pairs of ducts can be repeated until the desired pressure is reached. Optionally, a gaseous fluid (33) is introduced between the first and second duct of the first step, whose flow-rate is possibly regulated by a valve (23). Furthermore, in the first and/or second step and/or further step downstream of the latter, in an intermediate position between the ducts of each step, a part of said gaseous fluid (34), if present, may be subtracted, possibly by regulating its flow-rate by means of a regulation valve (25).

In a preferential variant of this first mode, the ascending ducts (12, 14, 16, . . . 18) can have a lower cross sectional area of the fluid with respect to the descending ducts (13, 15, 17, . . . 19). Generally, the area ratio between the descending section of duct with respect to the ascending duct is lower than 30, more preferably lower than 10, even more preferably less than 5. In a particular case, the ascending section can have the same section as the descending section. On the contrary, connection elements (22, 24), typically conical-shaped, are inserted downstream of each duct (ascending or descending).

The generatrix of the duct can have any form. The pipe, for example, can be spirally wound, or tilted with respect to the vertical. The pipe is preferably vertical.

There can be section variations along the duct, such as for example, narrowings or broadenings. It may be advantageous to typically maintain a larger section in the curved portions, in order to facilitate the passage of possible solid agglomerates.

The connection between the ascending and descending duct (26) and between the descending and ascending duct (27) can be an arched pipe, preferably consisting of curves with a wide radius to avoid blockage in the curve of possible large-sized agglomerates The introduction of gas (33) can be effected using a higher pressure source, supplied for example by a compressor. The dosage of the gas can be effected for example by means of rotameters or by means of regulation valves regulated in retroaction with respect to the gas flow-rate meter, for example, mass meters or pressure drop meters through a calibrated mouth ("DP-Cell").

The gas extracted (34) can also contain part of the liquid phase and possible solid phase at the inlet (31). The flow extracted (34) can possibly also have the same composition as the ingoing fluid (31), and maintain the same ratios between the liquid, gaseous and possibly solid mass.

The number of pairs of ducts (step 12-13; step 14-15; etc.) generally ranges from 2 to 500; preferably from 2 to 50; even more preferably from 2 to 10.

The number of pairs of ducts can also be defined on the basis of the pressure drop to be obtained. More specifically, the unitary efficiency yield of a pair of ducts can be defined as the hydrostatic head of the ascending column (therefore, equal to the product between the gravity acceleration times the density of the liquid, or liquid plus solid phase, multiplied by the difference in quota between the top and bottom of the ascending duct). According to this criterion, the number of ascending ducts necessary is given by the ratio between the pressure drop to be obtained and the unitary efficiency yield, divided by the efficiency. The efficiency typically ranges from 0.2 to 1.1.

It is surprisingly possible to vary the efficiency by varying the flow-rate of the fluid extracted (34), for example by regulating the opening of the extraction valve (25) or gas injection valve (23). Consequently, unlike hydrostatic columns, whose pressure difference is substantially given by the weight of the column of fluid, in the device of the present invention, these controls allow the pressure drop obtained to be regulated.

If the fluid fed (31) contains a gaseous phase, the extraction of the phase rich in gas (34) can be fundamental for avoiding flow instability, which generates strong fluctuations of the pressure drop obtained by the device.

It is advantageous to control the extraction valves (25) in retroaction with respect to a pressure signal or level. It is possible, for example, to control each extraction valve (25) in relation to the pressure difference registered by the fluid between the beginning and end of the descending duct immediately following said extraction of gas.

The correct regulation in retroaction of the extraction valves (25) generally makes the flow more stable, preventing the instability mentioned above, in particular when the flow at the inlet (31) undergoes variations in the flow-rate or composition.

The ascending and descending ducts can have different length, in particular if it is convenient for the device connected upstream of the ingoing fluid (31) not to be at the same height as the device which is connected downstream of the outgoing fluid (32).

Figure 2:
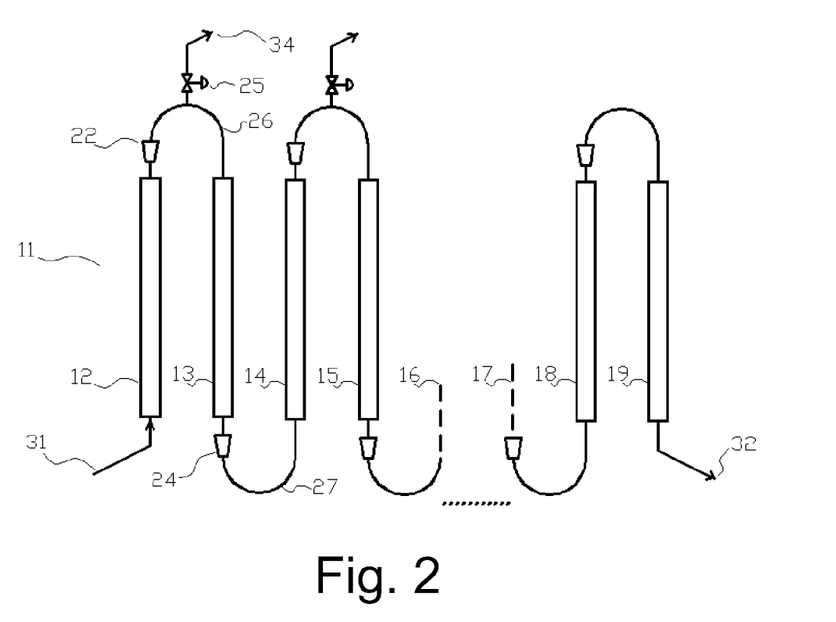

FIG. 2 illustrates an embodiment (hereafter called "M2") of the device of the present invention. This mode can be applied when the fluid to be depressurized contains a gaseous phase. Furthermore, this mode can be applied when the volume ratio between the gaseous flow-rate and the liquid flow-rate, evaluated at the inlet pressure, is higher than 0.05, preferably higher than 0.15, even more preferably higher than 0.3.

The mode "M2" differs from the mode "M1" in the extraction of the gas (34) also in the first section of the connection between the ascending and descending duct. Said extraction can be effected analogously to what has already been specified for the embodiment "M1".

The modes "M1" and "M2" can be combined, as there is both the extraction and introduction of gas in the same device. In this way, it is possible to depressurize fluid streams containing or not containing a gaseous phase, in the same device.

In order to prevent the solid material contained in the extracted gas from blocking the extraction pipeline, in particular in correspondence with the possible regulation devices (25), a filtering element can be inserted at the inlet of the extraction duct, which prevents the passage of particulate larger than a certain size.

In order to prevent the filtering element itself from becoming clogged, it can be convenient to install the filtering element either inside the duct (26), so that the process fluid itself effects the cleaning of the filter; or a flushing can be effected, preferably with the same process liquid, which keeps the filter clean. This flushing can be continuous or discontinuous, and can be applied either at the process side, therefore in co-current with respect to the filtration direction, or in counter-current.

The filtering element can be produced according to the known art. Valid filtering elements are composed, for example, of metallic meshes, whose pitch is sufficiently small as to prevent the formation of blockages in the equipment downstream of the filter, for example not more than half of the minimum cross sectional area. Vice versa, meshes which are excessively small cause high pressure drops and the possibility of obstruction of the filter itself on the part of the particulate present in the process fluid.

The gases collected from the extraction can be separated from the process fluid, for example for re-use or purging in the atmosphere, or re-inserted in the process fluid.

The subtraction of gas can be effected directly or by interposing a phase separator before the beginning of the descending duct.

The phase separator is any device suitable for at least partially separating the liquid phase from the gaseous phase. Non-limiting examples of phase separators known in the art are: stirred and non-stirred tanks, horizontal ducts (i.e. perpendicular to the force of gravity) or tilted with respect to the vertical direction, cyclones, centrifuges.

More generally, each device in which the rate of the fluid stream in the direction of gravity is lower than the ascending rate of the gaseous phase in the opposite direction to gravity (determined by the hydrostatic thrust) is a phase separator suitable for the purpose.

Another type of phase separator uses centrifugal force, alternatively or jointly with gravitational force, to separate the liquid fluid from the gaseous phase. The centrifugal force can be generated by the fluid itself, for example by exerting a spiral movement; an example of this device is a cyclone. Alternatively, the centrifugal force can be generated by an outside source; an example of this device is represented by centrifuges.

Figure 3:
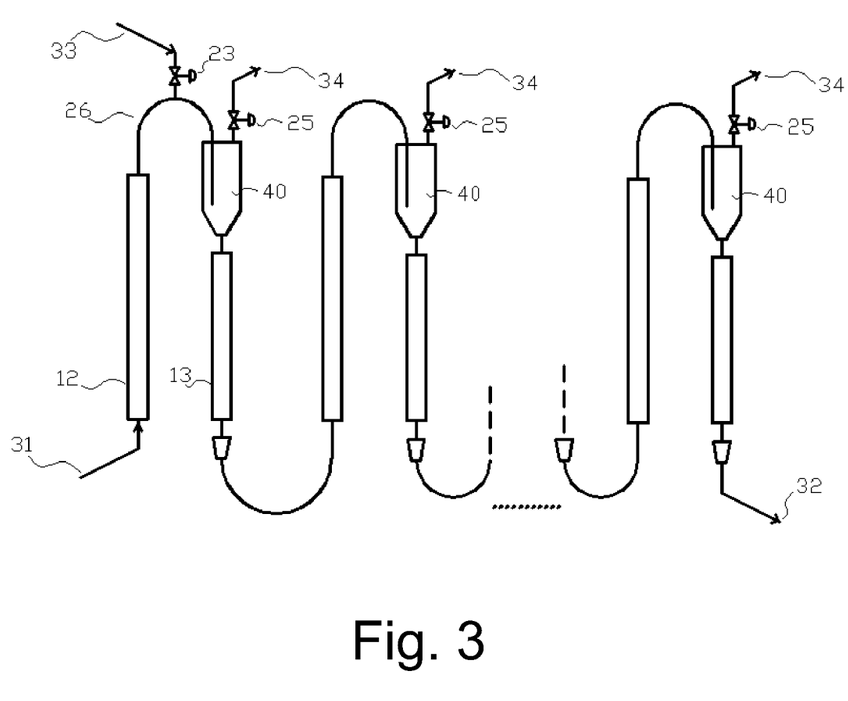

FIG. 3 illustrates the embodiment of the invention "M3" which uses said separation devices. With reference to FIG. 3, the device of the present invention comprises an inlet of high-pressure fluid (31) which is connected, as for the embodiments already described, to a plurality of pairs of ducts positioned vertically and connected in sequence. In the first duct of each pair, the fluid is passed from below upwards, while in the second duct, the fluid is passed from above downwards. The pairs of steps can be repeated until the desired pressure is reached. Optionally, between the first and second duct of the first step, a gaseous fluid (33) is introduced, whose flow-rate is possibly regulated by a valve (23). Said phase separator device (40) can be inserted between the first and second duct of each pair. Part of the gaseous phase, possibly regulated by a valve (25), is then extracted (34) to be subsequently treated as already described above.

The efficiency of the device of the present invention can also be regulated by varying the flow-rate of the gaseous phase fed (31).

It is not necessary to insert a separation device in all of the pairs of ducts.

Some non-limiting examples of the present invention are provided to illustrate the embodiments previously described.

Example A1

Figure 4:
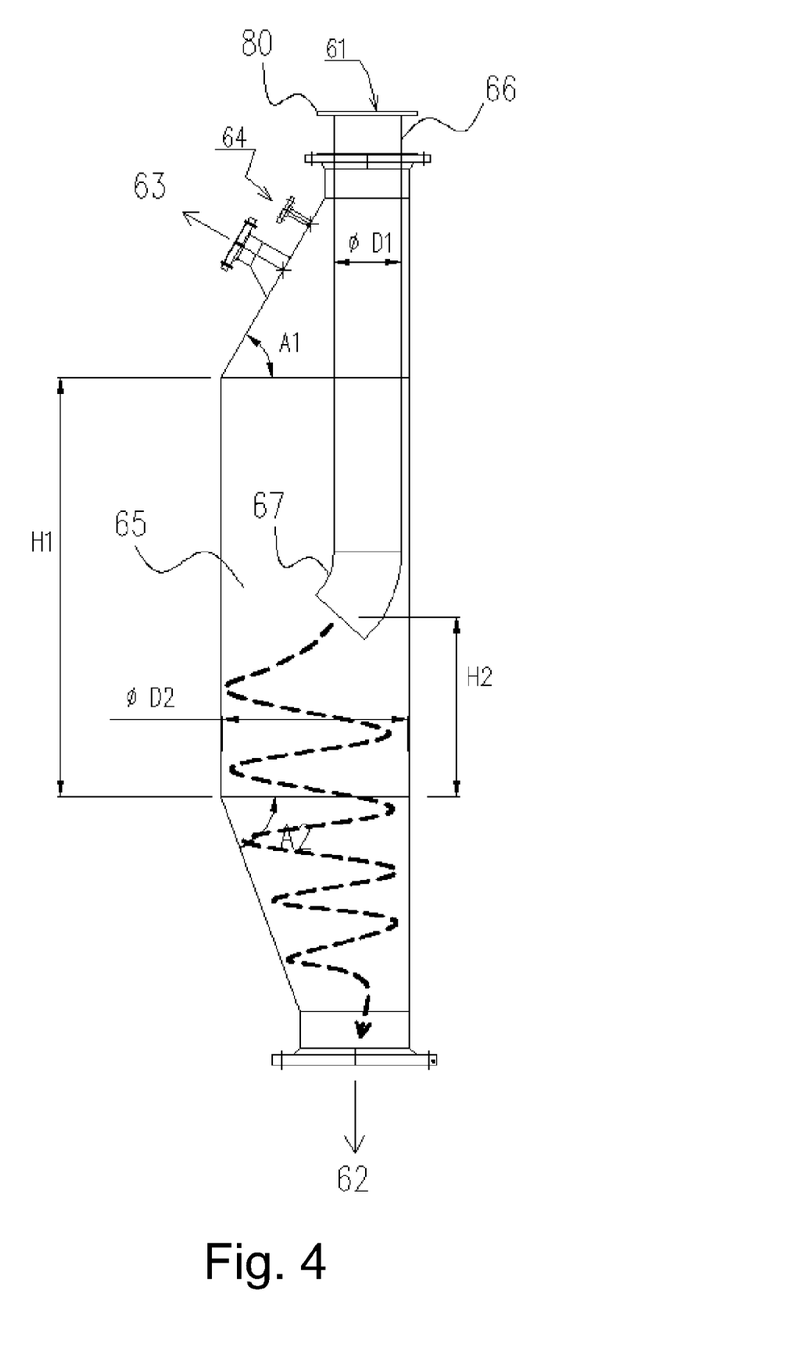
Figure 5:
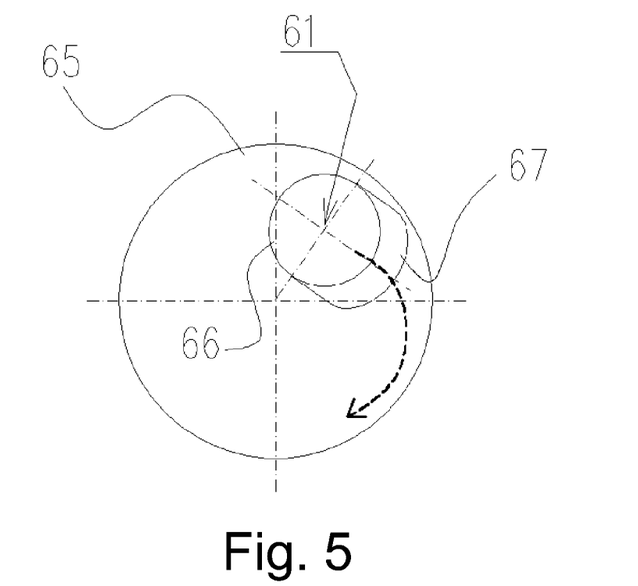

FIGS. 4 and 5 illustrate an example of a phase separator to be used with the embodiment "M3" described above.

The flow coming from the connection (26, FIG. 3) is fed to the telescope (66) by means of the flange (61) which introduces the fluid into the separator (65).

The phase separator (65) consists of a section of pipe having a diameter (D2) much greater than the diameter (D1) of the inlet pipe (66). The ratio between D2 and D1 is generally at least 1.2. The ratio between D2 and D1 preferably ranges from 1.5 to 10; even more preferably, the ratio between D2 and D1 ranges from 2 to 5.

The height of the outflow (H2) is typically lower than the height of the cylindrical section of the separator (H1), so as to maximize the separation of the gaseous phase. The fluid thus degassed passes to the descending duct (13, FIG. 3) through the flange (62). The angles (A1) and (A2) for the connection of the degasser to the telescope (66) and descending duct (62) can have any value between 0 and 90°. More preferably, (A1) and (A2) must be greater than 10° and lower than 80°.

The fluid richer in the gaseous phase is collected from the mouth (63), situated in the upper part of the degasser. It is optionally possible to insert a further mouth (64) for introducing a cleaning fluid of the separator (65) or for introducing a predetermined gas flow-rate. The latter can be useful, for example, for preventing the flooding of the degasser during the start-up phases or during process anomalies.

Cleaning nozzles can be optionally arranged inside the degasser for cleaning the internal walls of the same. The same liquid which forms the liquid phase fed from (61) can be advantageously used as cleaning liquid.

The telescope (66) can optionally terminate with a device for hydrodynamically improving the gas separation, such as for example a curve (67) which is arranged so that the outgoing fluid is directed tangentially to the walls of the separator (65), as illustrated in FIG. 5.

Example A2

With reference to the embodiments described above, a stream richer in gaseous phase (34) can be withdrawn from the upper area of the ascending ducts (12; 14; 16; . . . ) and descending ducts (13; 15; 17; . . . ) or from the connection section (26). Alternatively, said stream can be withdrawn from the separation device (40) connected between the two ducts, as illustrated in the embodiment "M3" described above.

A filtering can be useful for preventing the non-gaseous components of said stream richer in gaseous phase from generating blockages or malfunctioning of the equipment downstream of said stream, such as for example the valves (25) which can be installed for the regulation and control of the outgoing flow.

The filtering element can be advantageously situated inside or on the wall of the separation device or elements mentioned above. Alternatively, it can be applied along the outgoing duct of the flow rich in gaseous phase. In the latter case, said filtering element is preferably situated close to the beginning of the duct and therefore close to the device from which said fluid is extracted.

Figure 6:
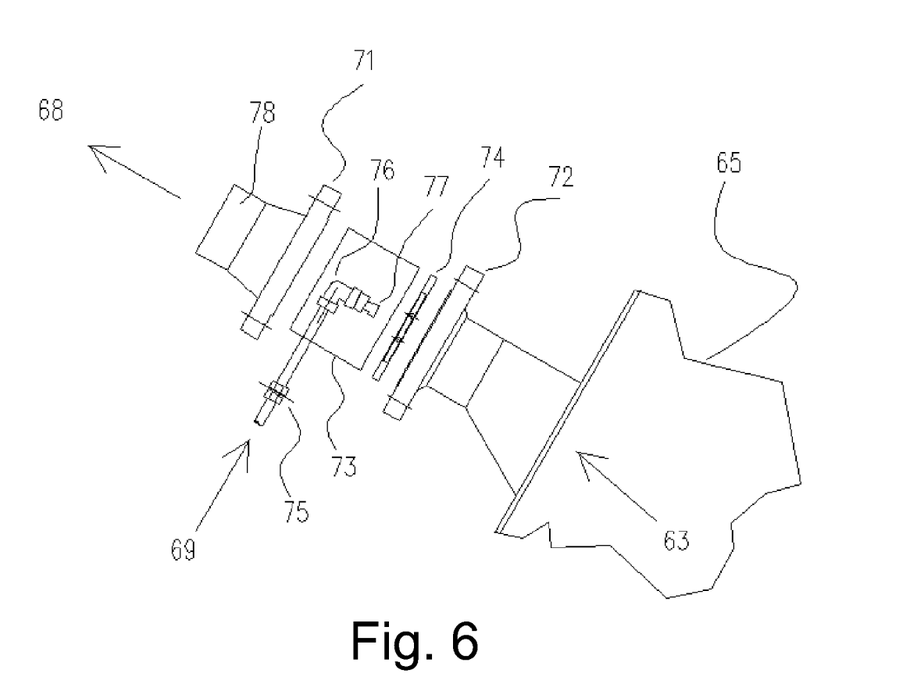

FIG. 6 illustrates an example of how said filtering can be effected.

The flow rich in gaseous phase (63) passes through the filter (74) situated along the duct (78) through which said fluid stream (63) removed from the device or duct (65), passes.

The filter can be applied as a "sandwich" between the mouth (72) of the device or duct (65) and the extraction duct (78). In this mode, the filter remains blocked through the closing of the flange (71) against the counterflange (72). Possible washers can be used for guaranteeing the seal, according to practices of the known art.

In order to prevent agglomerates or other solid phase from blocking the filter (74), it may be convenient to use a flushing (69). The flushing fluid (69) can be fed through the injection device (73), connected through a suitable connection (75) to the flushing tubing, to be subsequently aligned by a suitable element (76) against the filtering element (74), for example in the direction opposite to the direction of the movement of the flow rich in gas (63).

A nozzle (77) can be advantageously used, which converts the pressure energy of the flushing into kinetic energy. In this way, the cleaning of the filter (74) is facilitated.

The element (73) can also be sandwich-inserted between the flanges (71) and (72) and can be interpositioned before or after the filtering element (74).

Figure 7:
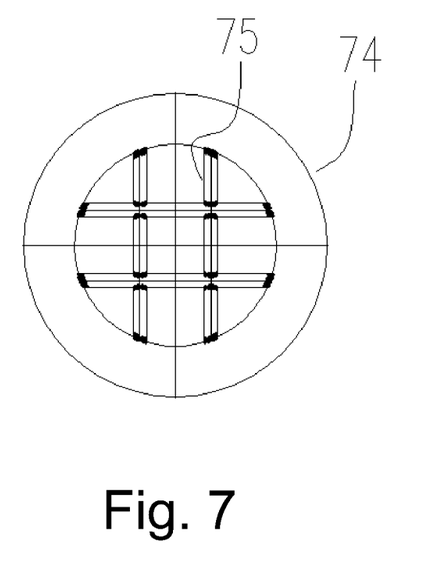

FIG. 7 illustrates an embodiment example of the filtering element. It is composed of an annular steel plate (74), on which 4 arms are welded, consisting of a steel rod (75) suitably fixed to the annular plate (for example by welding).

The filter is sandwich-applied between two flanges. The washer, to be applied on said annular plate on both sides, forms the seal when the bolts are tightened on the flanges.

Some practical illustrative examples of the embodiments previously described, are now provided.

EXAMPLE 1

A device is constructed for the depressurization of a fluid according to the embodiment "M2" described above.

The fluid (31) at the inlet of the depressurizer consists of a mixture of water, fed at a flow-rate of 7 tons per hour, and air, fed at a flow-rate of 1,500 normal liters per hour.

The first pair of ducts is described as follows. The ascending duct (12) consists of a steel pipe, having a nominal diameter of 3 inches (internal diameter, as per schedule, 77.83 mm), a length of 3,000 mm, vertically positioned. The section change (22) consists of a commercial reduction from 3 inches (7.62 cm) to 4 inches (10.16 cm) (nominal values). The curved section (26) consists of two commercial curves at 90° interspaced by a straight horizontal section of 200 mm, both of 4 inches (10.16 cm), on which a mouth connected to a ball valve (25), is inserted. The other end of the ball valve is open towards the atmosphere. The descending section (13) has a nominal diameter of 4 inches (10.16 cm) (internal diameter, as per schedule, 102.3 mm), and also has a length of 3,000 mm. The section change (24) also consists of a commercial reduction from 3 inches (7.62 cm) to 4 inches (10.16 cm). The curved section (27) consists of two curves at 90° interspaced by a straight horizontal section of 200 mm, both having a nominal diameter of 3 inches.

The scheme is repeated a further three times, consequently obtaining 4 pairs of ascending/descending pipes. The flow leaving the last pipe is poured from above into a tank maintained at atmospheric pressure.

In this example the extraction valves of the phase rich in gas (25) are kept closed.

The pressure measured by the manometer located on the fluid at the inlet of the depressurization device (31) indicates a pressure of 1.05 relative bar (1.05 barg, equivalent to 105 relative kPa). The pressure proves to be stable. The manometer situated at the outlet of the last pipe indicates atmospheric pressure.

COMPARATIVE EXAMPLE 1

The same device as Example 1 is rotated by 90°, so that the ducts (12, 13, . . . ) are no longer vertical (i.e. aligned with the Earth's gravity axis) but horizontal (and therefore orthogonal to the gravity axis).

The fluid (31) at the inlet of the depressurizer consists of a mixture of water and air, in the same proportions and with the same flow-rate as Example 1.

The pressure measured by the manometer located on the fluid at the inlet of the depressurization device (31) on an average indicates a pressure which is below the minimum threshold and therefore lower than 0.15 relative bar (0.15 barg, equivalent to 15 relative kPa). The manometer situated at the outlet of the last pipe indicates atmospheric pressure.

EXAMPLE 2

The same device as Example 1 is used, adopting as inlet fluid (31), 19.5 tons per hour of water and 10,500 normal liters per hour of air. The pressure measured by the manometer situated at the inlet of the device indicates a non-constant pressure, which varies with a period of less than a minute from 0.5 to 0.9 barg.

The extraction valve of the phase rich in gas (25) is opened. The pressure measured by the manometer is now constant and equal to 0.8 barg.

EXAMPLE 3

A device is constructed for the depressurization of a fluid according to the embodiment "M3" described above.

3 pairs of ducts are used. The first ascending duct (12) has a diameter of 150 mm and a length of 25 meters, arranged vertically. The curved section (26) consists of four commercial curves at 45° interspaced by straight sections of 300 mm. The injection of gas (33) is effected by applying a nozzle in the phase separator.

The phase separator is produced according to the mode described in Example A1. The outgoing gas flow is filtered using the device according to Example A2, using pressurized water as flushing fluid.

The second ascending duct is 30 meters high and the third ascending duct is 35 meters high. The descending ducts consist of piping having a diameter of 400 mm. The outgoing fluid (32) is at atmospheric pressure.

The depressurization device is fed by a stream of water, pressurized nitrogen and expandable polystyrene beads, deriving from the granulation of the molten expandable polymer, as described in the U.S. Pat. No. 7,320,585.

A water flow-rate ranging from 10,000 to 150,000 kg/h; a nitrogen flow-rate ranging from 0 Nm3/h to 200 Nm3/h; from 1,000 to 10.000 kg/h of expandable polystyrene beads, having an average diameter ranging from 0.7 to 2.0 mm, and agglomerates having an average dimension lower than 100 mm, are fed.

EXAMPLE 4

The depressurization device according to Example 3 is fed with a stream of water of 60,000 kg/h and 12 Nm3/h of nitrogen.

The regulation valve of the gas injection (23) and extraction valve (25) are kept closed.

The pressure measured at the inlet of the device is stable at 7.3 bar (730 kPa).

EXAMPLE 5

The depressurization device according to Example 3 is fed with a stream of water of 60,000 kg/h and 50 Nm3/h of nitrogen.

The regulation valve of the gas injection (23) is kept closed. In the first and second step, each regulation valve of the flow extracted rich in gas (25) is controlled in retroaction with respect to the pressure difference registered between the separator (40) of the same step and that of the subsequent step. The extraction valve (25) of the separator (40) of the first step is therefore in retroaction with respect to the pressure difference registered in the separator of the first step and that in the separator of the second step, whereas the extraction valve of the separator of the second step is in retroaction with respect to the pressure difference registered in the separator of the second step and that in the separator of the third step. The valve (25) situated in the separator of the third step, on the other hand, is completely open.

All of the three valves (25) indicated above are connected to the lower end of the descending duct of the third step.

The pressure difference set up at the regulation valve of the first step is equal to 2.2 bar (220 kPa) whereas the difference established at the regulation valve of the second step is equal to 2.6 bar (260 kPa). The pressure measured at the inlet of the device is stable at 6.8 bar (680 kPa).

EXAMPLE 6

Example 5 is repeated, with the difference that the pressure difference set up at the regulation valve of the first and second step is the same and equal to 0.7 bar (70 kPa). The pressure measured at the inlet of the device is stable at 3.4 bar (340 kPa).

EXAMPLE 7

A device is constructed for the depressurization of a fluid according to the embodiment "M2" described above, in which, however, there is no system for the intermediate extraction of fluid (34).

The fluid (31) at the inlet of the depressurizer consists of a mixture of liquid pentane, fed at a flow-rate of 0.8 kg per hour, and nitrogen, fed at a flow-rate of 0.04 normal liters per hour.

The ascending ducts consist of pipes having an internal diameter of 6 mm, a length of 500 mm arranged vertically. The descending ducts consist of pipes having an internal diameter of 20 mm, a length of 500 mm.

The overall number of pairs of ascending and descending ducts is equal to 100.

The pressure drop obtained is equal to 1.8 bar (180 kPa).

The invention claimed is:

1. A process for reducing the pressure of a fluid containing at least a liquid phase and a solid phase, the process comprises passing the fluid to be depressurized, in sequence, through a plurality of steps connected in series by means of first lower connectors, each step comprising a pair of vertical ducts connected in the upper part by means of second upper connectors, wherein the fluid passes from below upwards into the first duct of each step, and from above downwards into the second duct of each step, wherein part of the pressure energy of the fluid is converted into gravitational potential in the first duct of each step, part of the gravitational potential is converted into thermal energy in the second duct, wherein the fluid passes through the lower connectors of the steps which are situated between the descending duct of a pair of vertical ducts and the ascending duct of an adjacent subsequent pair of vertical ducts according to the movement of the fluid, and wherein a gaseous fluid is introduced between the first and second duct of at least the first step if the fluid to be depressurized does not contain a gaseous phase and/or the volume ratio between a gaseous flow rate and a liquid flow rate of the fluid to be depressurized at the inlet pressure is less than 0.2.

2. The process according to claim 1, wherein the introduction or removal of a fluid containing a gaseous phase is regulated between the first and second duct of each step.

3. The process according to claim 1, wherein the fluid to be depressurized fed, also includes a gaseous phase with a volume ratio between the gaseous flow rate and the liquid flow rate, measured at the inlet pressure, higher than 0.01.

4. The process according to claim 1, wherein, between the first and second duct of at least one step, a flow is extracted, whose gaseous component has a volume flow rate of at least 50% with respect to the extracted flow rate.

5. The process according to claim 4, wherein said fluid extraction is effected in a phase separator positioned between the first and second duct of the step.

6. The process according to claim 4, wherein said flow extraction is regulated in feedback with respect to the pressure difference measured between the lower and upper end of the second duct of the same step from which the extraction is effected.

7. The process according to claim 5, wherein said flow extraction is regulated in feedback with respect to the pressure difference measured between the phase separator of the same step from which the extraction is effected and a separator of a subsequent step.

8. The process according to claim 1, wherein the fed fluid comes from a granulator for thermoplastic polymers.

9. The process according to claim 1, wherein the second duct has a larger diameter with respect to the first duct.

10. The process according to claim 1, wherein the number of steps ranges from 2 to 500.

11. The process according to claim 10, wherein the number of steps ranges from 2 to 50.

12. The process according to claim 11, wherein the number of steps ranges from 2 to 10.

13. The process according to claim 1, wherein a gaseous fluid is extracted between the first and second duct of at least the first step if the fluid to be depressurized further contains a gaseous phase and the volume ratio between the gaseous flow-rate and the liquid flow-rate is elevated.

* * * * *